United States Patent [19]

Hayasaka

[11] Patent Number: 4,927,393
[45] Date of Patent: May 22, 1990

[54] FIXING STRUCTURE FOR BELLOWS OF MARINE PROPULSION DEVICE

[75] Inventor: Kenichi Hayasaka, Hamamatsu, Japan

[73] Assignee: Sanshin Kogyo Kabushiki Kaisha, Hamamatsu, Japan

[21] Appl. No.: 276,063

[22] Filed: Nov. 25, 1988

[30] Foreign Application Priority Data

Nov. 26, 1987 [JP] Japan .................. 62-298808

[51] Int. Cl.⁵ .................................... F16J 3/04
[52] U.S. Cl. .................... 440/112; 440/111; 277/212 FB
[58] Field of Search ............ 440/111, 112, 49, 53, 440/57, 76, 88, 89; 277/212 PB, 30, 207 A; 285/226

[56] References Cited

U.S. PATENT DOCUMENTS

| 4,201,391 | 5/1980 | Bankstahl | 440/112 |
| 4,375,356 | 3/1983 | Stevens | 440/112 |
| 4,543,069 | 9/1985 | Kobayashi | 440/112 |
| 4,753,619 | 6/1988 | Sullivan | 440/112 |

*Primary Examiner*—Joseph F. Peters, Jr.
*Assistant Examiner*—Clifford T. Bartz
*Attorney, Agent, or Firm*—Ernest A. Beutler

[57] ABSTRACT

A securing means for a flexible bellows which covers universal joint in a marine inboard/outboard drive unit. The flexible bellows has an end portion which is inserted within a cylindrical opening in an outboard drive casing. The bellows end portion is secured by a retaining sleeve which engages the inner surface of the bellows and forms a seal between the casing and the retaining sleeve. The retaining sleeve has a tubular body to engage the end portion of the flexible bellow and a flange portion to affix the retaining sleeve to the swivel casing. The retaining sleeve has a pair of lips attached to its flange portion for easy installation and removal.

5 Claims, 3 Drawing Sheets

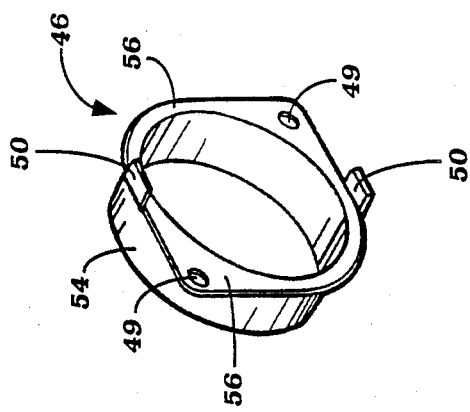
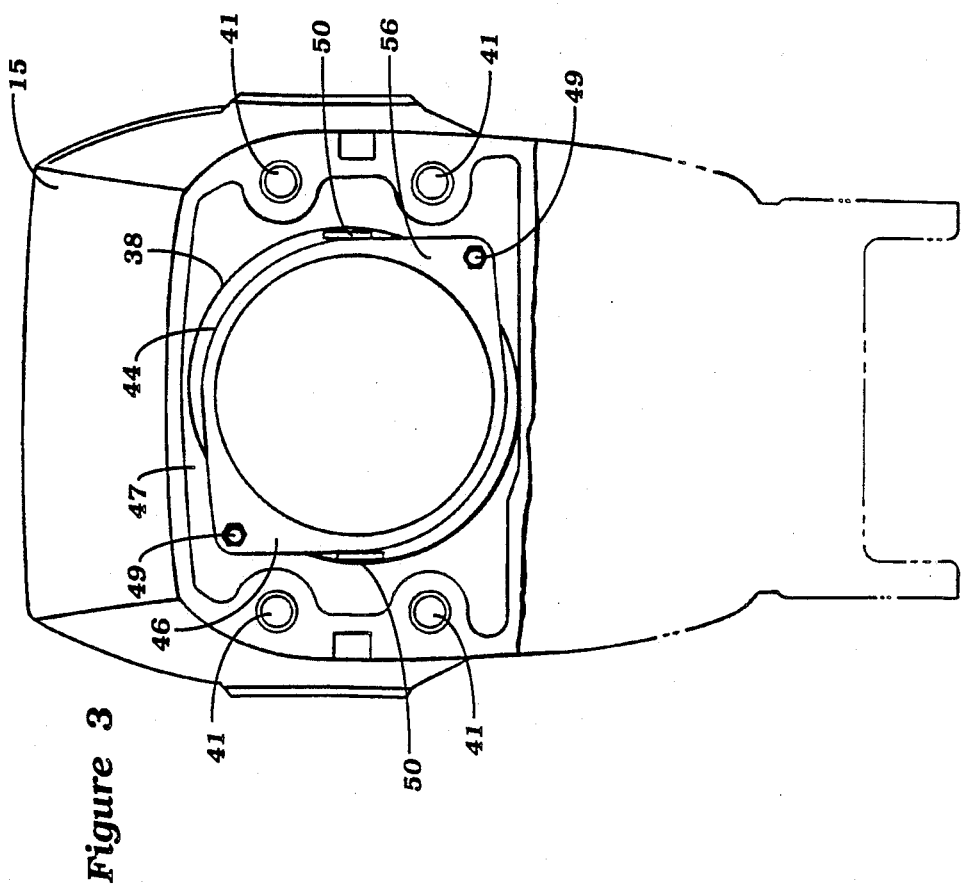

FIXING STRUCTURE FOR BELLOWS OF MARINE PROPULSION DEVICE

BACKGROUND OF THE INVENTION

This invention relates to a fixing structure for a flexible bellows for a marine propulsion device and more particularly concerns the end connection and sealing structure of the flexible bellows within the outboard drive unit.

Marine inboard/outboard drive units generally include an inboard engine having an output shaft and an outboard drive unit having an input shaft coupled by a universal joint to the engine output shaft. The universal joint is enclosed within a gimbal ring and a casing of the outboard drive unit. A flexible bellows covers the universal joint and is secured to the outboard drive unit to form a water tight seal. A known technique for securing the bellows to the outboard drive unit is to affix the bellows end to the outer periphery of a projection defining a cylindrical opening within the outboard drive casing. A fastening band or ring exerts a radially inward force against the outer periphery of the bellow end against the outer surface of the cylindrical projection of the retaining casing. This technique is difficult to install and inspect during assembly of the outboard unit because the fastening band is housed within the casing.

In another known technique, the rear end of the bellows is inserted into an opening in the casing and secured by the attachment of the main housing of the drive unit. This technique causes problems since the seal cannot be visually checked once the outboard drive unit is assembled.

It is therefore the principal object of the present invention to provide a sealing means for a flexible bellows end that can be visually inspected during assembly.

It is another object of the present invention to provide a retaining sleeve which is capable of securely sealing a flexible bellows end portion in an outboard drive casing.

It is another object of the present invention to provide a retaining sleeve which may be easily installed and removed during the assembly of the outboard drive unit.

SUMMARY OF THE INVENTION

According to the present invention, the end portion of the bellows comprises a cylindrical end which is disposed within a cylindrical opening in the outboard drive casing. A retaining sleeve is inserted within the bellows' cylindrical end portion and affixed to the back side of the casing. The retaining sleeve engages the inner surface of the bellows end to create a seal between the sleeve and casing.

BRIEF DESCRIPTION OF THE DRAWINGS

FIG. 3 is an end view of the casing with the retaining sleeve installed within the flexible bellows end portion.

FIG. 4 is a perspective view of the retaining sleeve.

DETAILED DESCRIPTION OF THE PREFERRED EMBODIMENT OF THE INVENTION

Figure 1:
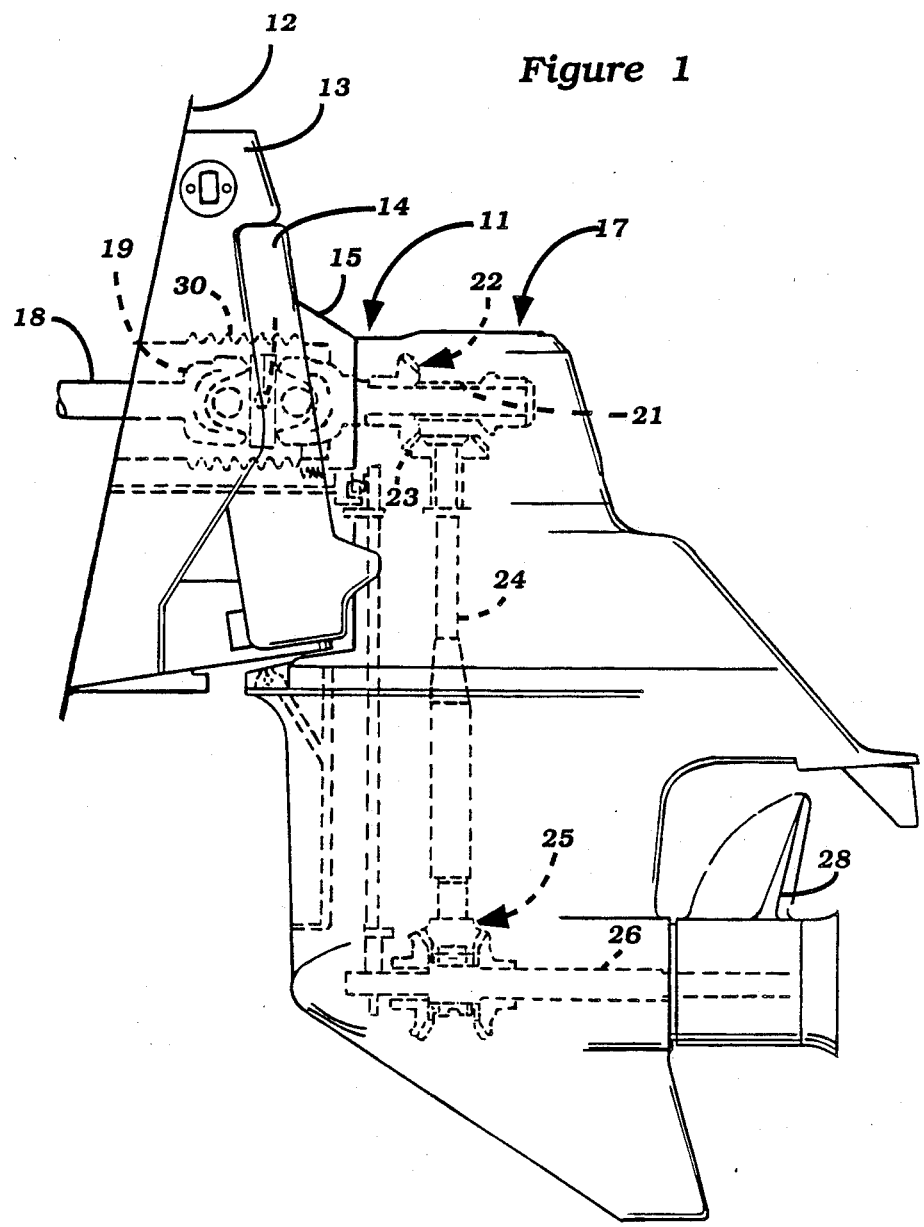
FIG. 1 is a side elevational view of the outboard drive of a marine inboard/outboard drive unit.

Referring now to the drawings, FIG. 1 illustrates an outboard drive unit of a marine inboard/outboard drive constructed and identified generally by the reference numeral 11. The outboard drive 11 is adapted to be utilized in conjunction with an associated watercraft, the transom of which is identified at 12. A transom plate or gimbal housing 13 of the outboard drive 11 is affixed in a known manner to the transom 12 and supports a gimbal ring 14 for steering movement about a generally vertically extending axis. A casing 15 of the outboard drive unit 11 is connected to the gimbal ring 14 for tilting movement about a generally horizontally extending axis defined by a pair of gimbal pins 16 so that the angular position of a main housing 17 of the outboard drive unit may be adjusted to various trim adjusted positions.

An engine driven output shaft 18 is driven by an inboard engine (not shown) and extends through a suitable opening in the transom 12. A universal joint 19 couples the driving shaft 18 to a driven shaft 21 that is journaled within the housing 17 in a known manner. A bevel gear 22 is affixed for rotation with the shaft 21 and is enmeshed with a driven bevel gear 23 that is non-rotatably affixed to the upper end of a drive shaft 24. The drive shaft 24 is suitably journaled for rotation about a generally vertically extending axis within the housing 17 in a known manner.

A forward, neutral, reverse transmission, indicated generally by the reference numeral 25, is provided for selectively coupling the drive shaft 24 to a propeller shaft 26 that is journaled in a lower unit 27 of the housing 17. The propeller shaft 26 is journaled in a known manner and is affixed to a propeller 28 for powering the associated watercraft.

There is provided a flexible bellows 30 that encircles the universal joint 19 and provides a waterproof seal between the transom 12 and the outboard drive unit 11. The seal is achieved by affixing the flexible bellows 30 to the gimbal housing 13 and casing 15.

Figure 2:
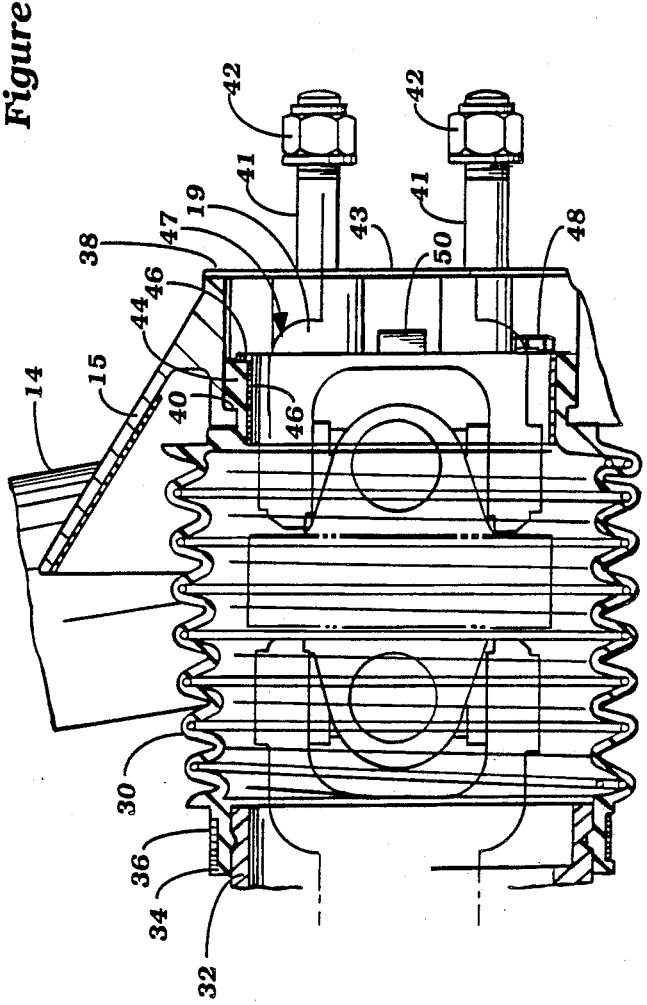
FIG. 2 is an enlarged cross-sectional view of an upper portion of the outboard drive unit, with detail given to the attachment of the flexible bellows to the casing.

FIG. 2 shows the universal joint 19 journaled through a gimbal bracket opening 32, gimbal ring 14 and casing 15. The bellows 30 has a slightly thickened front portion 34 which is placed around the outer periphery of the gimbal bracket opening 32 and secured by fastening ring or clamp 36.

The casing 15 has a cylindrical opening 38 which accommodates the universal joint 19 and has an annular protrusion 40 extending around the inner periphery of the cylindrical opening 38. The drive unit housing 17 is mounted on the casing 15 by studs 41 fixed to the casing 15 and nuts 42. The flexible bellows 30 has a slightly thickened end portion 44 which is disposed within the cylindrical opening 38 in the casing 15. The bellows end portion 44 has an annular groove 46 receiving the annular protrusion 40 in cylindrical opening 38 for locating and sealing purposes.

A retaining sleeve 46 is disposed within and engages the flexible bellows 30 end portion 44 to create a waterproof seal between the retaining sleeve 46 and the cylindrical opening 38 in casing 15. The retaining sleeve 46 is secured to a casing shoulder 47 by bolts 48. The retaining sleeve 46 also includes a pair of lips 50 that provides a gripping means for easy installation and removal.

FIG. 3 illustrates the end view of casing 15 with the main housing 17 removed. The retaining sleeve 46 has a cylindrical portion 54 disposed within the flexible bellows end portion 44 which in turn is disposed within the casing cylindrical opening 38. The retaining sleeve 46 has a flange portion 56 at one end of the cylindrical portion which contains a pair of openings 49 through which the bolts 48 affix the retaining sleeve 46 to the casing shoulder 47. The lips 50 extend perpendicularly from flange portion 56 of retaining sleeve 46 and may be gripped by the appropriate tool for easy installation or removal. The main housing 17 is mounted on the studs 41 and nuts 42. FIG. 3 clearly, illustrates how the seal created by the retaining sleeve 46 can be visually inspected during the installation of the outboard drive unit 11 and how the seal is formed and checked before the main housing 17 is installed.

Thus it is apparent that there has been provided, in accordance with the invention, a sealing means for a bellows end that fully satisfies the objects, aims and advantages set forth above. While the invention has been described in conjunction with a preferred embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

I claim:

1. A marine propulsion device comprising an engine output shaft leading through a transom mount, a universal joint coupling said engine output shaft with an input shaft of a drive unit for directing engine output to a propulsion means of said drive unit, a swivel casing having a cylindrical opening to accommodate a portion of said universal joint, said swivel casing affording tilting movement of said drive unit relative to said transom mount, and a flexible bellows extending over said universal joint, wherein said bellows includes a cylindrical end disposed within said cylindrical opening in swivel casing and a retaining sleeve having a sleeve portion engaging the inner surface of said bellows cylindrical end to form a seal between said retaining sleeve and said cylindrical opening in swivel casing, said retaining sleeve further comprising a flange portion for directly affixing said retaining sleeve to said swivel casing.

2. A marine propulsion device defined in claim 1 wherein the inner surface of said cylindrical opening in swivel casing contains at least one annular protrusion engaging corresponding grooves in outer periphery of said bellows end.

3. A marine propulsion device defined in claim 1 wherein said retaining sleeve contains at least one lip attached to said flange portion of sleeve for attaching or detaching said retaining sleeve.

4. A marine propulsion device as set forth in claim 3 wherein the lips extend away from the flange portion in a direction opposite to the sleeve portion.

5. A marine propulsion device as set forth in claim 1 wherein the flange portion is formed with a pair of apertures for passing threaded fastening means for affixing said retaining sleeve to said swivel casing.

* * * * *